United States Patent
Mickelson et al.

(10) Patent No.: US 7,494,586 B2
(45) Date of Patent: Feb. 24, 2009

(54) TREATMENT SYSTEM FOR LIQUID CONCRETE WASHOUT WASTE

(75) Inventors: Kevin Mickelson, Carmichael, CA (US); Roger Engelsgaard, Citrus Heights, CA (US)

(73) Assignee: Concrete Washout Systems, Inc., Wilton, CA (US)

( * ) Notice: Subject to any disclaimer, the term of this patent is extended or adjusted under 35 U.S.C. 154(b) by 164 days.

(21) Appl. No.: 11/261,290

(22) Filed: Oct. 27, 2005

(65) Prior Publication Data

US 2007/0170119 A1    Jul. 26, 2007

Related U.S. Application Data

(60) Provisional application No. 60/622,854, filed on Oct. 27, 2004.

(51) Int. Cl.
C02F 1/58 (2006.01)
C02F 1/66 (2006.01)

(52) U.S. Cl. .............. 210/195.3; 210/194; 210/202; 210/241

(58) Field of Classification Search .......... 210/195.3
See application file for complete search history.

(56) References Cited

U.S. PATENT DOCUMENTS

| | | | | |
|---|---|---|---|---|
| 2,350,111 A | * | 5/1944 | Hood | 210/724 |
| 2,359,748 A | * | 10/1944 | Clemens | 210/711 |
| 3,278,022 A | | 10/1966 | Moeschler | |
| 4,188,291 A | * | 2/1980 | Anderson | 210/639 |
| 4,221,633 A | * | 9/1980 | Laipenieks | 162/154 |
| 4,678,584 A | | 7/1987 | Elfline | |
| 4,943,377 A | | 7/1990 | Legare, III | |
| 4,999,116 A | | 3/1991 | Bowers | |
| 5,273,661 A | * | 12/1993 | Pickett et al. | 210/710 |
| 5,462,670 A | * | 10/1995 | Guess | 210/713 |
| 5,618,439 A | * | 4/1997 | Allgulin | 210/713 |
| 5,833,863 A | | 11/1998 | Richards et al. | |
| 5,992,774 A | | 11/1999 | Oh | |

(Continued)

FOREIGN PATENT DOCUMENTS

JP    02002137941 A    5/2002

OTHER PUBLICATIONS

Yelton, Rick, Treating Process Water, Publication #J970441, The Concrete Producer, Jun. 1997.

*Primary Examiner*—Peter A. Hruskoci
(74) *Attorney, Agent, or Firm*—John P. O'Banion

(57) ABSTRACT

Solid and liquid concrete waste is collected from a construction site and safely off-loaded at a treatment site. Solid waste is separated and sent to a crusher to be made into road bed aggregate. Liquid waste is put in a first tank to settle the solids, then moved to a second tank to settle remaining fine solids, and moved to a third tank coupled to a circulation pump with $CO_2$ gas injection to lower the pH. The liquid in the third tank is then filtered before discharging for recycle, irrigation or dust control. A precipitate agent is preferable added to the liquid in the third tank to remove heavy metals and the precipitate is periodically backwashed from the filter into the first tank. The sludge created in the settling and filtering process is periodically dewatered in the first tank and mixed with the solid concrete waste sent to the crusher.

13 Claims, 3 Drawing Sheets

U.S. PATENT DOCUMENTS 6,066,262 A    5/2000  Montgomery et al.
6,287,471 B1 * 9/2001  De Rigaud .................. 210/724

2005/0145548 A1  7/2005  Rhoades

* cited by examiner

TREATMENT SYSTEM FOR LIQUID CONCRETE WASHOUT WASTE

CROSS-REFERENCE TO RELATED APPLICATIONS

This application claims priority from U.S. provisional application Ser. No. 60/622,854, filed on Oct. 27, 2004, which is incorporated herein by reference in its entirety.

STATEMENT REGARDING FEDERALLY SPONSORED RESEARCH OR DEVELOPMENT.

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to treatment of concrete washout waste, and more particularly to treatment of waste liquid associated with washout of concrete trucks and associated equipment on construction sites and at concrete batch plants.

2. Description of Related Art

Construction sites have long been identified as a large contributor to urban runoff pollution if the proper pollution prevention practices are not regularly performed. Construction materials washed into the storm drain have a direct impact on local waterways and habitat living in that environment.

The most common discharge into storm drains from concrete construction activity is the residue and contaminants from washing down equipment such as concrete trucks, pumps, mixers, chutes, hand tools and wheelbarrows. Other cementitious contaminants include washout from grout, mortar and stucco. Once released into a storm drain, the solids and sediments are not easily removed and the high pH and suspended solids of the waste are extremely toxic to aquatic wildlife.

Temporary washout areas with berms, haybales, linings and catchment systems are typically used on construction sites, but with poor results. These temporary sites are prone to leaking or flooding during rains. Evaporation or leaching as a method to remove the liquid waste is not environmentally safe or practical. Dumpsters and sludge boxes are also used to contain washout waste but are prone to leaking during use or during transport.

Some concrete trucks are equipped with a reclaimer system, a temporary storage for washout waste that is returned to the batch plant for recycling. These systems require valuable time for the operator to use and need ongoing maintenance to stay operational.

On some construction sites, individual plastic bags are used to contain washout waste. These small bags, typically about 5 gallons, are time consuming to use and usually require two persons to handle during washout activities. They may be left on the jobsite for several weeks exposed to the elements, rough ground, and puncture hazards.

Some existing systems transport the concrete waste to evaporation ponds or lagoons to evaporate the liquid and then bury, dispose or recycle the remaining solids. Evaporation ponds are subject to leaking high pH liquid with suspended solids and heavy metals into the environment. In some cases, pH treatment is performed in place to reduce the environmental risk of leaking evaporation ponds.

BRIEF SUMMARY OF THE INVENTION

The invention is a treatment system and method for treating liquid waste from concrete washout activity. In one example, a truck mounted liquid concrete waste vacuum system with a storage tank is adapted to be used in conjunction with a watertight concrete washout bin placed at a construction site. The concrete washout bin is configured to roll off a transport vehicle for delivery to a construction site and to contain all solid and liquid concrete washout waste from construction activities. When the concrete washout waste is to be removed from the site, the liquid concrete waste vacuum system attached to the transport vehicle is first used to remove the liquid waste from the washout bin and store it in the tank. The bin containing the remaining solid waste is loaded on the transport vehicle and taken to the treatment facility where both the solid and liquid waste is safely off-loaded. The storage tank on the truck is preferably about 300 gallon capacity.

The solid and liquid concrete wastes are transported to the treatment facility. Solid waste is separated and sent to a crusher to be made into road bed aggregate. Liquid waste is put in a first tank to settle the solids, then moved to a second tank to settle remaining fine solids, and moved to a third tank coupled to a circulation pump configured with $CO_2$ gas injection to lower the pH. The liquid in the third tank is then filtered before discharging for recycle, irrigation or dust control. A precipitate agent is preferably added to the liquid in the third tank to remove heavy metals. The sludge created in the settling process in the first tank is periodically dewatered and mixed with the concrete solid waste sent to the crusher. The filter is periodically backwashed into the first tank.

An embodiment of the invention is a treatment system for treating liquid concrete waste that comprises a first tank configured to receive liquid concrete waste, where the first tank is configured to settle suspended solids, a second tank configured to receive liquid from the first tank, where the second tank is configured to settle suspended solids, a third tank, configured to receive liquid from the second tank, a $CO_2$ injector hydraulically coupled to the third tank, where the $CO_2$ injector is adapted to reduce pH by injecting $CO_2$ into liquid circulated from the third tank, a discharge line hydraulically coupled to the third tank, where the discharge line is adapted to discharge treated liquid from the third tank, and a filter positioned in the discharge line, the filter adapted to remove suspended particles from liquid flowing through the discharge line from the third tank.

Another aspect of the invention is a treatment pad adapted to support the first, second and third tank, where the treatment pad is further adapted to prevent spills of liquid concrete waste.

A still further aspect of the invention is where the treatment pad is further adapted to receive a concrete washout waste bin, and where the treatment pad is further adapted to receive solid concrete waste.

Another aspect of the invention is where the first tank is adapted to collect sludge from the second tank and from the third tank, and where the first tank is adapted to dewater the sludge for removal.

A still further aspect of the invention is where the filter is configured to remove particles sized at about 45 microns or more.

Another aspect of the invention is where the third tank is adapted to receive a precipitating agent.

A further aspect of the invention is where the precipitating agent is sodium dimethyldithiocarbamate.

Another embodiment of the invention is a first tank configured to receive liquid concrete waste, where the first tank is configured to settle suspended solids, a second tank, configured to receive liquid from the first tank, where the second tank is configured to settle suspended solids, a $CO_2$ injector hydraulically coupled to the second tank, where the $CO_2$ injector adapted to reduce pH by injecting $CO_2$ into liquid circulated from the second tank, a discharge line hydraulically coupled to the second tank, where the discharge line is adapted to discharge treated liquid from the second tank, and a first filter positioned in the discharge line, the first filter adapted to remove suspended particles from liquid flowing through the discharge line from the second tank.

Another aspect of the invention is where the first filter is configured to remove particles as small as about 45 microns.

A further aspect of the invention is a second filter adapted to filter particles from liquid flowing from the first tank to the second tank.

A still further aspect of the invention is a treatment pad adapted to support the first and second tank, where the treatment pad is further adapted to prevent spills of liquid concrete waste.

Another aspect of the invention is where the treatment pad is further adapted to receive a concrete washout waste bin, and where the treatment pad is further adapted to receive solid concrete waste.

A further aspect of the invention is where the first tank is adapted to collect sludge from the second tank, and where the first tank is adapted to dewater the sludge for removal.

Another embodiment of the invention is a method of treating liquid concrete waste having suspended particles that comprises providing a first tank, second tank, a $CO_2$ injector and a filter, placing the liquid concrete washout waste in the first tank, settling the suspended particles to form a sludge, separating the liquid from the sludge in the first tank, transferring the liquid from the first tank to the second tank, reducing the pH of the liquid in the second tank by injecting $CO_2$ in the liquid, transferring the liquid from the second tank through the filter, and discharging the filtered liquid.

Another aspect of the invention is adding sodium dimethyldithiocarbamate to the liquid in the second tank to form a precipitate, and removing the precipitate with the filter.

A further aspect of the invention is removing the sludge from the first tank, and crushing the sludge into an aggregate road base.

A still further aspect of the invention is forming precipitated particles in the second tank, and transferring the precipitated particles from the second tank to the first tank.

Another aspect of the invention is forming a filter cake on the filter, and transferring the filter cake from the filter to the first tank.

A further embodiment of the invention is a method of treating liquid concrete waste having suspended particles that comprises providing a first tank, a second tank, a third tank, a $CO_2$ injector and a filter, placing the liquid concrete washout waste in the first tank, settling the suspended particles to form a first sludge, separating the liquid from the first sludge in the first tank, transferring the liquid from the first tank to the second tank, settling the liquid in the second tank to form a second sludge, separating the liquid from the second sludge in the second tank, transferring the liquid from the second tank to the third tank, reducing the pH of the liquid in the third tank by injecting $CO_2$ in the liquid, transferring the liquid from the third tank through the filter, and discharging the filtered liquid.

Another aspect of the invention is adding sodium dimethyidithiocarbamate to the liquid in the third tank to form a third sludge, and transferring the third sludge to the first tank.

A further aspect of the invention is dewatering the first sludge in the first tank, transferring the first sludge from the first tank to a crusher, and crushing the first sludge into an aggregate road base.

A still further aspect of the invention is forming precipitated particles in the third tank, and transferring the precipitated particles from the third tank to the first tank.

Another aspect of the invention is forming a filter cake on the filter, and transferring the filter cake from the filter to the first tank.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
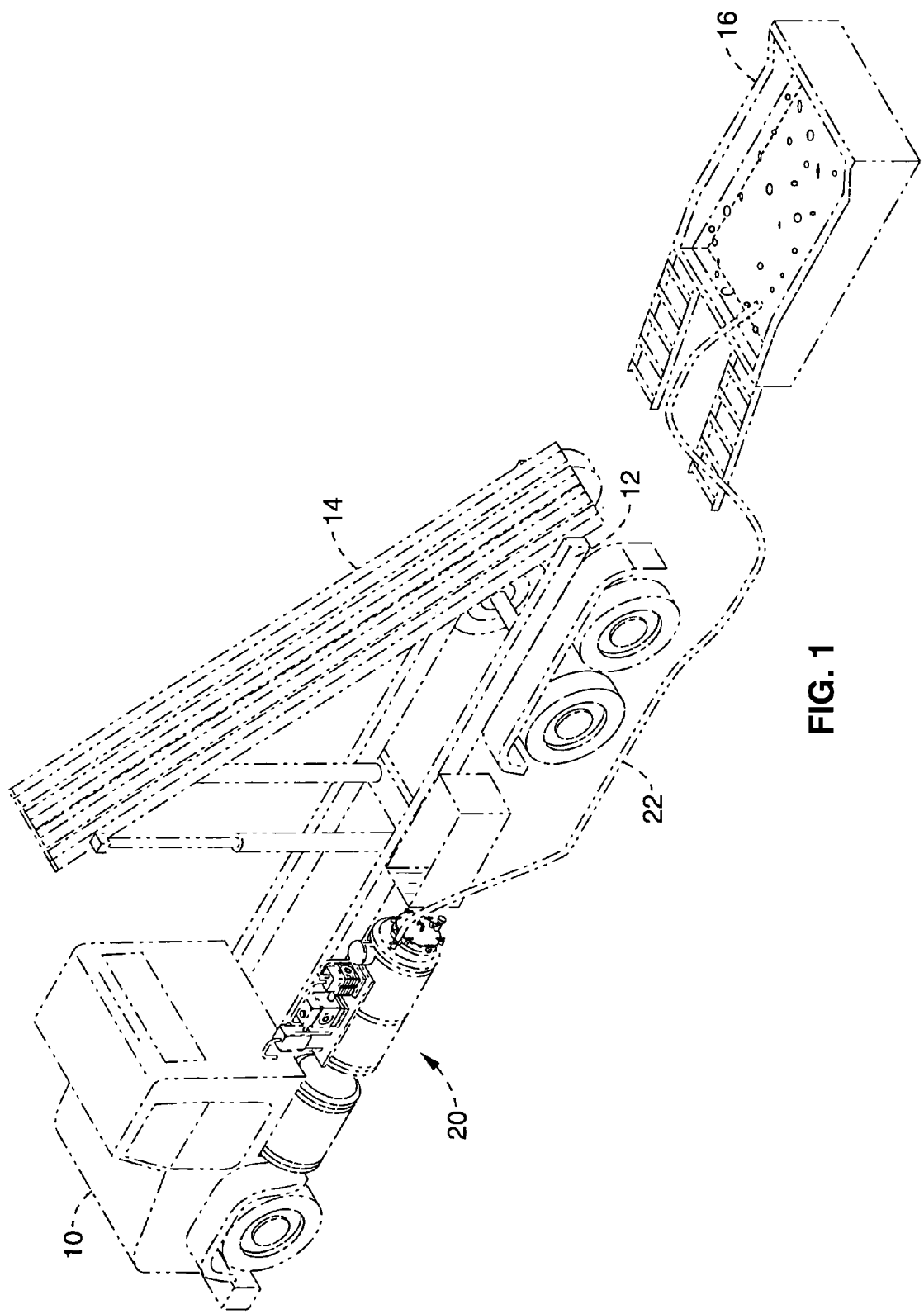
FIG. 1 illustrates a schematic view of a concrete washout bin adapted to collect liquid concrete waste and a transport vehicle adapted to transport liquid concrete washout waste.
Figure 2:
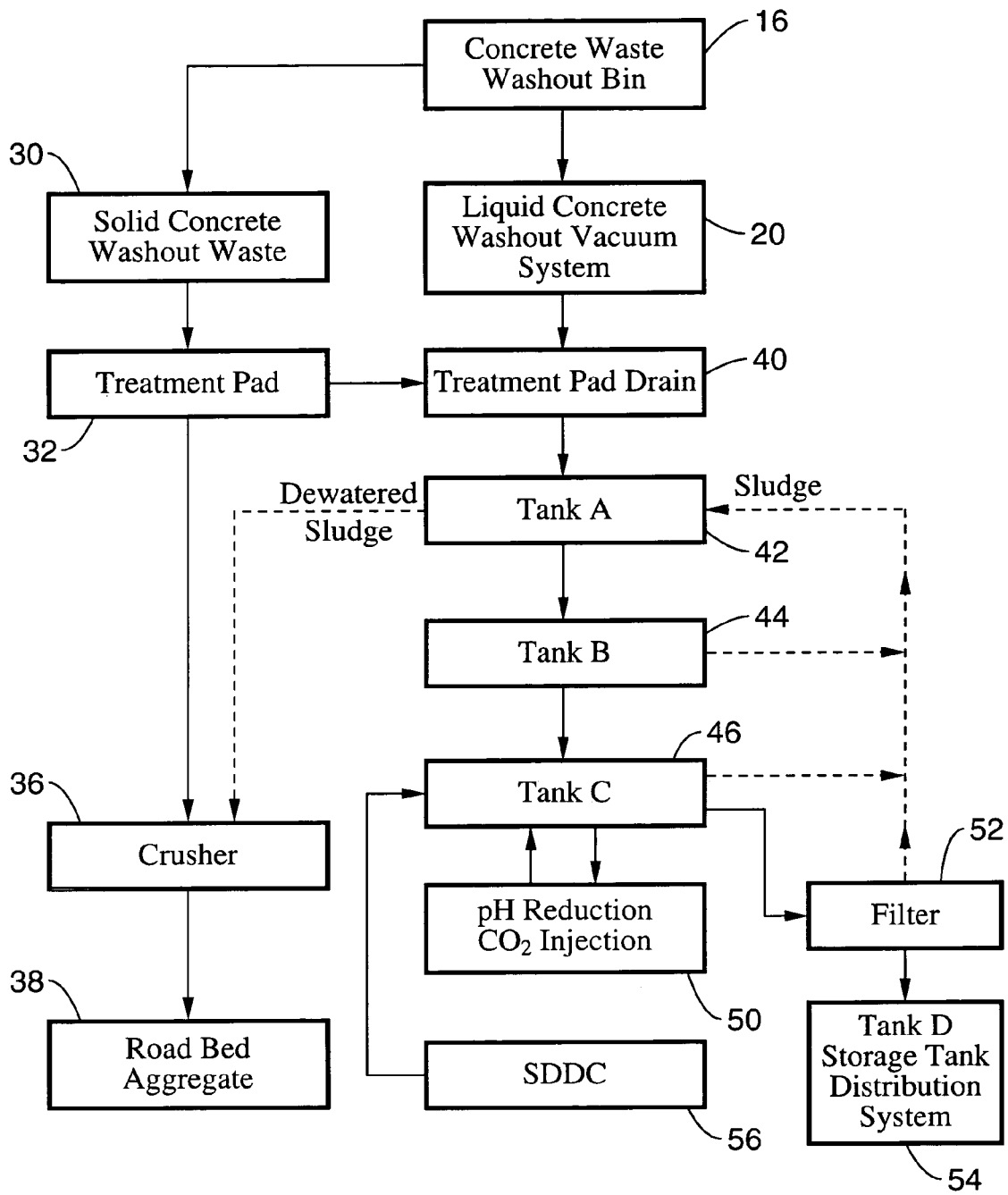
FIG. 2 is schematic diagram of a treatment system for liquid concrete waste according to the invention.
Figure 3:
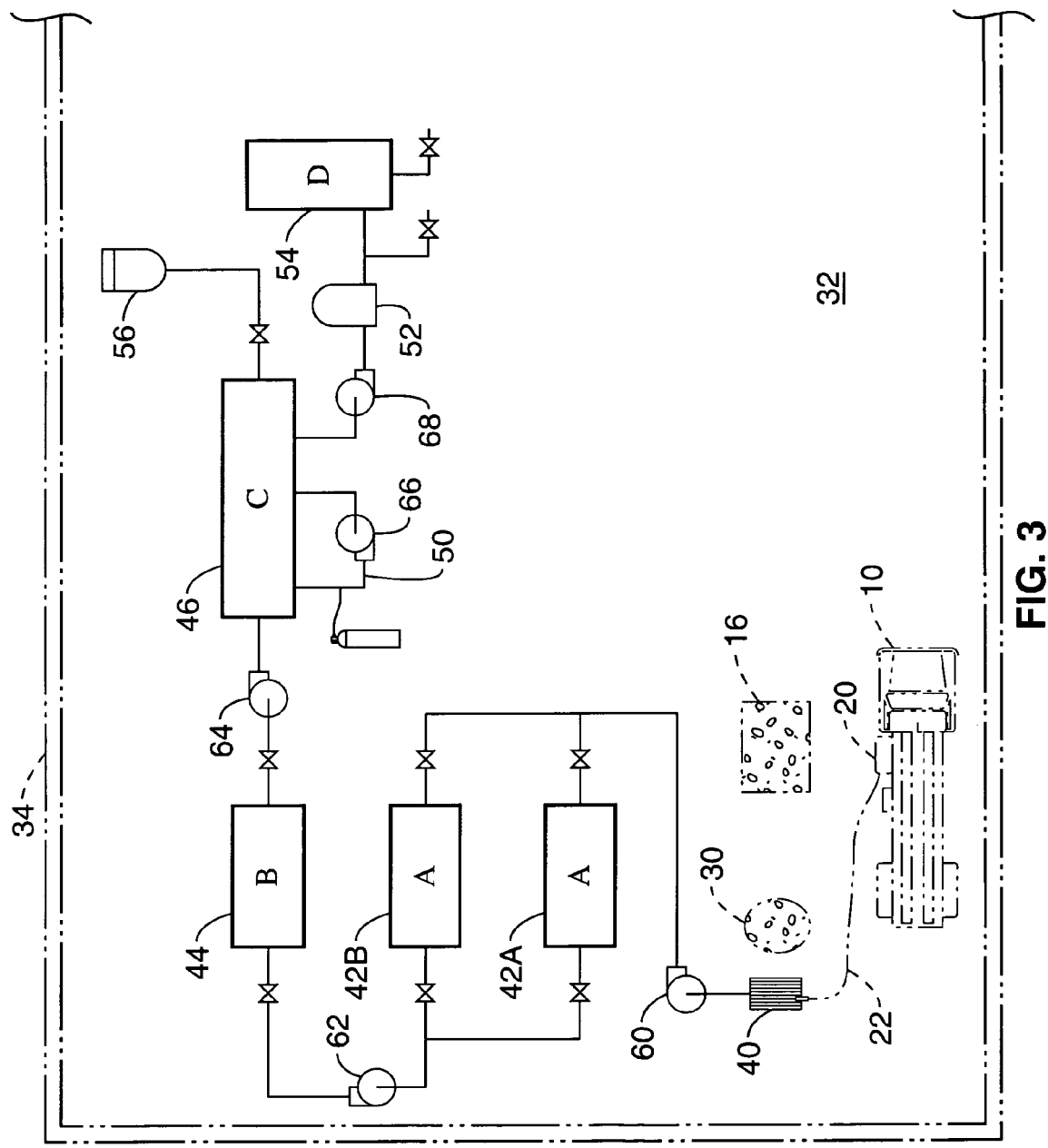
FIG. 3 is a schematic layout of the treatment system described in FIG. 2 according to the invention.

Referring more specifically to the drawings, for illustrative purposes the present invention is embodied in the apparatus generally shown in FIG. 1 through FIG. 3. It will be appreciated that the apparatus may vary as to configuration and as to details of the parts, and that the method may vary as to the specific steps and sequence, without departing from the basic concepts as disclosed herein.

FIG. 1 illustrates a transport vehicle 10 equipped with frame 12 and elevating slide rack 14 for handling skid loaded containers such as concrete washout bins 16. Concrete wash out bins are typically located at sites of concrete activity and are used by concrete mixer trucks to wash concrete solids from their equipment before returning to the batch plant.

A liquid concrete waste vacuum system 20 is mounted to truck 10 and consists of a tank and vacuum pump mounted to truck frame 12. Hose 22 is connected to waste vacuum system 20 and is used to access liquid in concrete washout bin 16.

During retrieval of a concrete washout bin 16 containing washout waste, the liquid concrete waste vacuum system 20 is used to remove the liquid waste from the bin before loading onto the transport vehicle 10. Both the liquid waste in vacuum system 20 and the solid waste in concrete washout bin 16 are transported to a treatment facility at the same time.

FIG. 2 is a schematic flow diagram of a concrete washout treatment system according to the present invention. Concrete waste washout bin 16 collects concrete washout waste at a construction site. The liquid waste is transported to the treatment facility either in the concrete wash out bin 16 or in a concrete wash out vacuum system 20 attached to the transport vehicle as illustrated in FIG. 1.

Solid concrete washout waste 30, such as aggregate and hardened concrete, can be removed from the concrete washout bin 16, by dumping on a treatment pad 32 where it can be swept or shoveled. Treatment pad 32 is sloped and has curbs or berms 34 (shown in FIG. 3) to contain any liquid from concrete waste washout bin 16 and associated washing activities and to prevent accidental spills. Solid concrete washout waste 30 is transferred to a crusher 36 and recycled into class 11 aggregate road base at box 38.

Treatment pad 32 also has drain sump 40 to collect liquid from washing activities. The liquid concrete washout waste is collected from the concrete washout bin by washing, or pumped from the truck mounted storage tank of liquid concrete washout vacuum system 20 to a first large tank 42, also designated tank A. Tank A preferably has a capacity of about 4,000 gallons and, in one embodiment, is fabricated from a watertight 20 yard debris bin with a flat bottom. The liquid waste in tank A is preferably allowed to settle for at least about 12 hours, thus allowing the majority of suspended solids and particulates to settle to the bottom forming a sludge. In one embodiment, there are a plurality of Tank A's to allow simultaneous filling, settling and dewatering.

Next, the liquid from tank A is preferably transferred to a tank 44, also designated Tank B. Tank B preferably has a capacity of about 8,000 gallons and in one embodiment, is fabricated from a watertight 40 yard debris bin with a flat bottom. The liquid in tank B is preferably allowed to settle for at least about 48 hours providing further settling of the fine suspended solids and particulates into a sludge.

The liquid from tank B is transfered into a tank 46, also designated Tank C. Tank C preferably has a capacity of about 8,000 gallons and, in one embodiment, is fabricated from a watertight 40 yard debris bin with a flat bottom.

When tank C is about full, the liquid is circulated through a Carbon Dioxide ($CO_2$) gas injection system 50 that injects $CO_2$ into the recirculated liquid to bring the pH from a typical level of about 12 to 12.5 to a preferable level of about 7.25 to about 7.75. In one mode of operation, about 25 pounds of $CO_2$ are used to treat about 8,000 gallons of liquid. Once the pH in tank C has been lowered to about 7.25 to about 7.75, tank C is allowed to settle for at least about 24 hours.

In a preferred embodiment, $CO_2$ injection system 50 is placed in an enclosure and automated with a pH sensor, liquid pump and controller. In some situations, the preferred pump is about ½ to about ¾ horsepower, such as used for circulating swimming pool water, and is coupled to tank C with conventional plumbing fittings.

After the liquid in tank C has settled for at least about 24 hours or more, it is pumped through a filter 52 for reuse such as non-crop irrigation, dust control or water for mixing concrete. Tank 54, also designated Tank D can be a storage tank, a water truck or an irrigation distribution system. Water from tank D can be used for washing concrete waste washout bins, concrete trucks and concrete equipment on treatment pad 32.

In a second embodiment of the invention, after pH treatment, the liquid in tank C is treated with a sodium dimethyldithiocarbamate (SDDC) precipitate agent 56, such as NAMET™, to precipitate heavy metals such as Chromium (Cr) and Molybdenum (Mo). In one mode, about 1.5 lbs of dry NAMET™ is added to about 8,000 gallons of waste water in tank C. In one test of this mode, total Cr was about 0.28 ppm after the water was treated. In another mode, about 4 lbs of dry NAMET™ is added to about 8,000 gallons of liquid waste reduce the total Cr to less than 0.28 ppm. In a further mode, about 2 quarts of liquid NAMET™ is added to Tank C to remove almost all the Cr and most of the Mo.

In a preferred embodiment, the precipitate formed in the bottom of tank C after treatment with SDDC is vacuumed and transferred to tank A. In another embodiment, the precipitate formed after treatment with SDDC is vacuumed, dewatered and disposed of in an environmentally safe manner such as a hazardous waste landfill.

In a preferred embodiment, filter 52 is a paper cartridge filter system similar to a residential swimming pool filter system and is configured to filter particles sized at about 45 microns or greater. In one embodiment, heavy metals present in the liquid adhere to the particles that form the sludge, or filter cake, on filter 52. Thus some of the precipitate of iron (Fe), aluminum (Al) and Chromium (Cr) is removed in this fashion. In a preferred mode, filter 52 is periodically cleaned by backwashing the filter cake into tank A. In another mode, the filter cake is dewatered and disposed as a hazardous waste. In a further mode, the used paper filter with the filter cake is disposed as hazardous waste.

In a less preferable embodiment, filter 52 is a polymer filter charged to remove heavy metal ions such as Cr. In a further, less preferable embodiment, filter 52 is a reverse osmosis system. These less preferable embodiments are significantly more costly than a paper cartridge filter.

In an alternative embodiment, Tanks A, B and/or C have rounded or cylindrical bottoms. In a further alternative of this embodiment, Tanks A and/or B are concrete structures. Further, Tanks A, B and/or C could have liners suitable for the pH of the liquid waste solution and for vacuuming sludge from the bottom.

In another alternative embodiment, Tank B is omitted from the system. In this alternative, settling times for Tank A and Tank C can be increased or the throughput of liquid to be treated is decreased. In a further alternative embodiment, Tank B is replaced with a filter, such as a sand filter, that removes particles as the liquid is moved from Tank A to tank C. This filter can be cleaned periodically by backwashing into Tank A. In a still further embodiment, an additional tank C is added to the system to provide additional treatment capacity and water storage.

In a further alternative embodiment, pH reduction is accomplished by addition of an acid to Tank C. Acid can be added in liquid solution or solid form. Although nitric acid, acetic acid or muratic acid would be preferable in this embodiment, any acidic material such as vinegar, acidic fermentation of food processing waste or an acidic waste stream from an industrial process would be suitable to neutralize the pH in tank C. Any contaminates present in the acidic material would need to be neutralized or removed before discharge of the treated liquid from Tank C. Acid treatment can be used in conjunction with or to supplement the $CO_2$ injection system.

In an alternative mode of operation, chlorine or other chemicals can be added to the liquid in Tank D to disinfect the liquid or control algae or insect growth. In a further alternative mode, a zeolite treatment method or water softening chemicals are used to remove hardness in the water in Tank D.

In a preferred mode of operation, particulate sludge is accumulated in Tank A until it is about 18 inches to about 24 inches deep. Tank A is then drained and the sludge is dewatered until it can be scooped or shoveled out of Tank A. The dewatered sludge from Tank A is mixed with the solid concrete waste 30 removed from the concrete washout bins 16 and is processed through crusher 36 and used as class 11 aggregate road base 38.

In a further mode of operation, a second Tank A is placed in service while the first Tank A is dewatered and the sludge removed. First and second Tanks A are then alternated in service.

In another mode of operation, any sludge or silt buildup on the bottom of Tank B is periodically removed with a vacuum, such as a swimming pool vacuum system, and placed into Tank A.

In an exemplary embodiment, the treatment system described above discharges water that meets Environmental Protection Agency (EPA) drinking water standards for pH, turbidity and heavy metals.

FIG. 3 illustrates a schematic plan view of an equipment layout for a concrete liquid treatment system. Treatment pad 32 is sloped toward drain sump 40 and has curbs or berms 34 on at least three sides to prevent liquid waste or spills from draining into the environment. A transport vehicle 10 deposits concrete waste washout bin 16 near drain sump 40. Liquid concrete washout vacuum system 20 empties liquid concrete waste through hose 22 into drain sump 40 or alternatively into a tank A (42).

Solid concrete waste 30 from concrete waste washout bin 16 and washing activities collects on treatment pad 32 where it can be swept or scooped and transported to a crusher (not shown). In a further embodiment, the concrete pad measures about 40 feet by about 100 feet.

Two tank A's are shown and designated 42A and 42B. One can be in service settling or dewatering sludge while the other is receiving liquid concrete waste. A pump 60 transfers liquid from sump 40 to tank A. After settling in tank A for at least about 12 hours, clarified water from tank A is transferred by pump 62 into adjacent tank B. Liquid in tank B settles for at least 48 hours. Clarified water from tank B is transferred by pump 64 from tank B into tank C.

As described previously in FIG. 2, $CO_2$ injection system 50 recirculates liquid from tank C with pump 66 and lowers the pH of the liquid. A sodium dimethyldithiocarbamate (SDDC) precipitate agent 56 is added to the liquid in Tank C to precipitate heavy metals such as Cr and Mo. SDDC can be added manually or with an automated dispersal device.

After settling, liquid from Tank C is transferred by pump 68 through filter system 52 and used directly for washing, mixing or irrigation or is transferred to Tank D for reuse, irrigation or disposal.

In one embodiment, a portable pump is used for pumps 60, 62, and/or 64. The portable pump is preferably about ½ horsepower and preferably uses about a 1½ inch diameter hose. In a further embodiment, level switches are placed in tanks A, B and C to control pumps 60, 62, and 64 to prevent accidental overfilling.

In another embodiment of the invention, an enclosure with a roof is placed around and over tanks A, B and C to keep out rain and protect the treatment system from unauthorized access. In a further embodiment, the $CO_2$ injection system 50 is positioned in an enclosure to protect it from the elements and to prevent unauthorized access.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A treatment system for treating liquid concrete waste, comprising:
   a concrete washout bin for containing liquid concrete waste;
   a first tank configured to receive liquid concrete waste from said bin;
   wherein said first tank is configured to settle suspended solids;
   a second tank configured to receive liquid from said first tank;
   wherein said second tank is configured to settle suspended solids;
   a third tank configured to receive liquid from said second tank;
   a $CO_2$ injector hydraulically coupled to said third tank;
   wherein said $CO_2$ injector is adapted to reduce pH by injecting $CO_2$ into liquid circulated from said third tank;
   a discharge line hydraulically coupled to said third tank;
   wherein said discharge line is adapted to discharge treated liquid from said third tank; and
   a filter positioned in said discharge line;
   said filter adapted to remove suspended particles from liquid flowing through said discharge line from said third tank.

2. A treatment system as recited in claim 1, further comprising:
   a treatment pad adapted to support said first, second and third tank;
   wherein said treatment pad is further adapted to prevent spills of liquid concrete waste.

3. A treatment system as recited in claim 2:
   wherein said treatment pad is further adapted to receive said concrete washout waste bin; and
   wherein said treatment pad is further adapted to receive solid concrete waste.

4. A treatment system as recited in claim 1:
   wherein said first tank is adapted to collect sludge from said second tank and from said third tank; and
   wherein said first tank is adapted to dewater said sludge for removal.

5. A treatment system as recited in claim 1, wherein said filter is configured to remove particles sized at about 45 microns or more.

6. A treatment system as recited in claim 1, wherein said third tank is adapted to receive a precipitating agent.

7. A treatment system as recited in claim 6, wherein said precipitating agent is sodium dimethyldithiocarbamate.

8. A treatment system for treating liquid concrete waste, comprising:
   a concrete washout bin for containing liquid concrete waste;
   a first tank configured to receive liquid concrete waste from said bin;
   wherein said first tank is configured to settle suspended solids;
   a second tank configured to receive liquid from said first tank;
   wherein said second tank is configured to settle suspended solids;
   a $CO_2$ injector hydraulically coupled to said second tank;
   wherein said $CO_2$ injector adapted to reduce pH by injecting $CO_2$ into liquid circulated from said second tank;
   a discharge line hydraulically coupled to said second tank;
   wherein said discharge line is adapted to discharge treated liquid from said second tank; and
   a first filter positioned in said discharge line;
   said first filter adapted to remove suspended particles from liquid flowing through said discharge line from said second tank.

9. A treatment system as recited in claim 8, wherein said first filter is configured to remove particles as small as about 45 microns.

10. A treatment system as recited in claim 8, further comprising a second filter adapted to filter particles from liquid flowing from said first tank to said second tank.

11. A treatment system as recited in claim 8, further comprising:
    a treatment pad adapted to support said first and second tank;
    wherein said treatment pad is further adapted to prevent spills of liquid concrete waste.

12. A treatment system as recited in claim 11:
    wherein said treatment pad is further adapted to receive said concrete washout waste bin; and
    wherein said treatment pad is further adapted to receive solid concrete waste.

13. A treatment system as recited in claim 8:
    wherein said first tank is adapted to collect sludge from said second tank; and
    wherein said first tank is adapted to dewater said sludge for removal.

* * * * *